US012751806B2

(12) United States Patent
Katz et al.

(10) Patent No.: US 12,751,806 B2
(45) Date of Patent: Oct. 6, 2026

(54) COMBINED CONTAINER AND ORTHODONTIC RETAINER CLEANING APPARATUS

(71) Applicant: Brushy LLC, Katonah, NY (US)

(72) Inventors: Alan Katz, Katonah, NY (US); Thomas Wright, S. Deerfield, MA (US)

(73) Assignee: Brushy LLC, Ketonah, NY (US)

( * ) Notice: Subject to any disclaimer, the term of this patent is extended or adjusted under 35 U.S.C. 154(b) by 205 days.

(21) Appl. No.: 18/421,018

(22) Filed: Jan. 24, 2024

(65) Prior Publication Data

US 2024/0268941 A1 Aug. 15, 2024

Related U.S. Application Data

(60) Provisional application No. 63/543,954, filed on Oct. 13, 2023, provisional application No. 63/576,366, filed on Feb. 9, 2023.

(51) Int. Cl.
*A61C 19/00* (2006.01)
*A61C 19/02* (2006.01)

(52) U.S. Cl.
CPC ............ *A61C 19/002* (2013.01); *A61C 19/02* (2013.01)

(58) Field of Classification Search
CPC ... A61C 19/002; A61C 19/02; E05B 73/0023; E05B 61/00; E05B 9/00; E05B 55/00
USPC ........................... 206/63.5, 368, 1.5; 15/21.1
See application file for complete search history.

(56) References Cited

U.S. PATENT DOCUMENTS

| | | | | |
|---|---|---|---|---|
| 1,845,315 A * | 2/1932 | Meikle | A46B 9/04 | 15/160 |
| 3,135,987 A * | 6/1964 | Huch | A46B 15/00 | 15/268 |
| 4,984,323 A * | 1/1991 | Digby | A46B 9/04 | 15/21.1 |
| 5,298,077 A * | 3/1994 | Saarela | A46B 15/00 | 15/160 |
| 7,386,906 B2 * | 6/2008 | Roth | A46B 13/06 | 15/97.1 |
| 9,198,745 B1 * | 12/2015 | Trahan | A46B 7/08 | |
| 9,332,826 B2 * | 5/2016 | Spillman, Jr. | A46B 11/002 | |
| 11,503,902 B1 * | 11/2022 | Burris | A46B 13/04 | |
| 2003/0116449 A1 * | 6/2003 | Hensel | B65D 25/22 | 206/829 |
| 2011/0226648 A1 * | 9/2011 | Zhang | B25G 1/105 | 206/781 |

(Continued)

FOREIGN PATENT DOCUMENTS

WO WO-2017173479 A1 * 10/2017 ............. A46B 13/08

*Primary Examiner* — Rafael A Ortiz
(74) *Attorney, Agent, or Firm* — Neil D. Gershon

(57) ABSTRACT

A container for cleaning an orthodontic appliance comprising a first component having a first set of bristles arranged in a first array and a second component having a second set of bristles arranged in a second array, the second set of bristles extending toward the first set of bristles when the container is in a closed condition. The first component is rotatable relative to the second component to clean the orthodontic appliance positioned within the container. The first component can be releasably lockingly engageable with the second component to clean the orthodontic appliance as the first and second sets of bristles frictionally engage the orthodontic appliance on opposite sides.

15 Claims, 10 Drawing Sheets

(56) References Cited

U.S. PATENT DOCUMENTS

2014/0311527 A1* 10/2014 Doll .................... A61C 17/036
134/115 R

* cited by examiner

FIG. 1
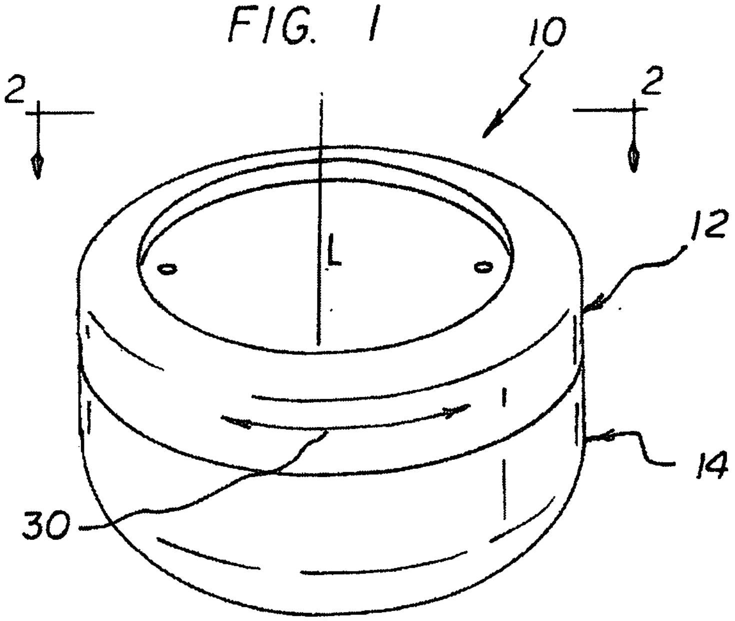
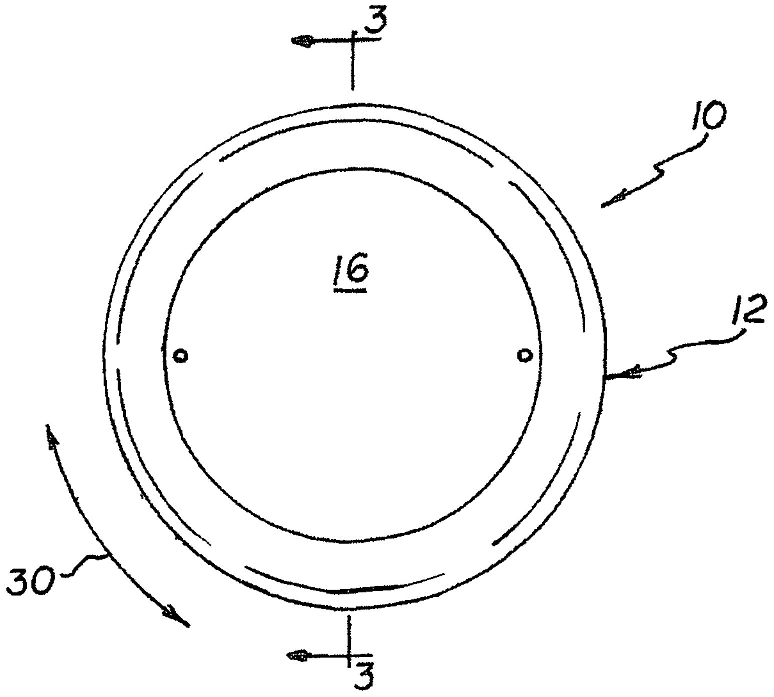
FIG. 2

FIG. 3
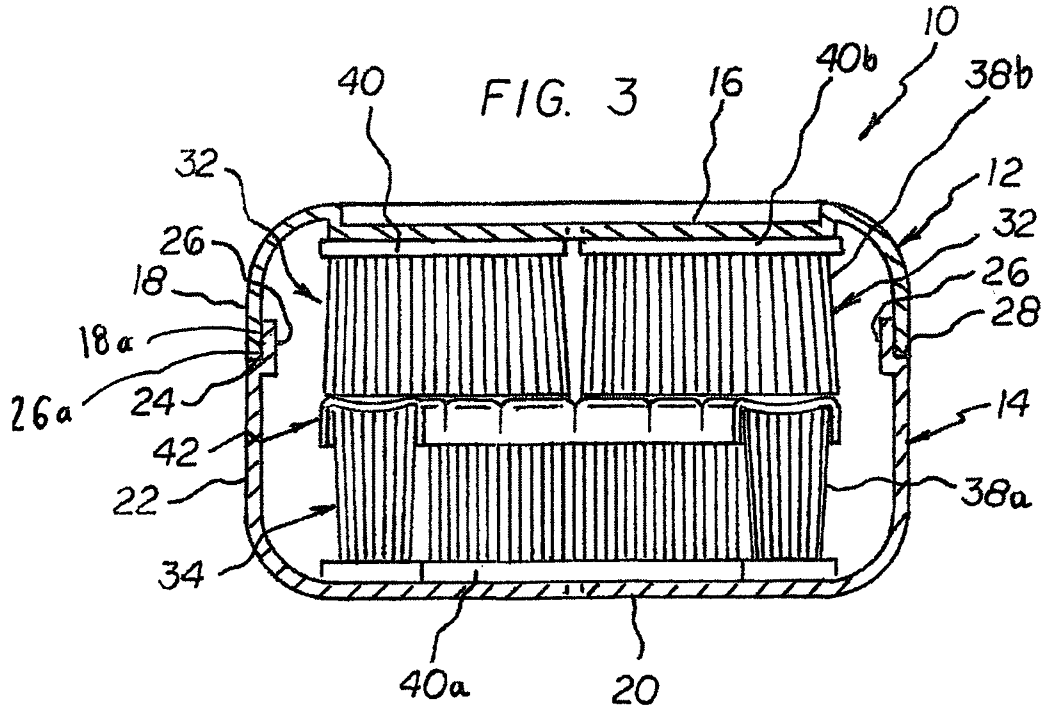
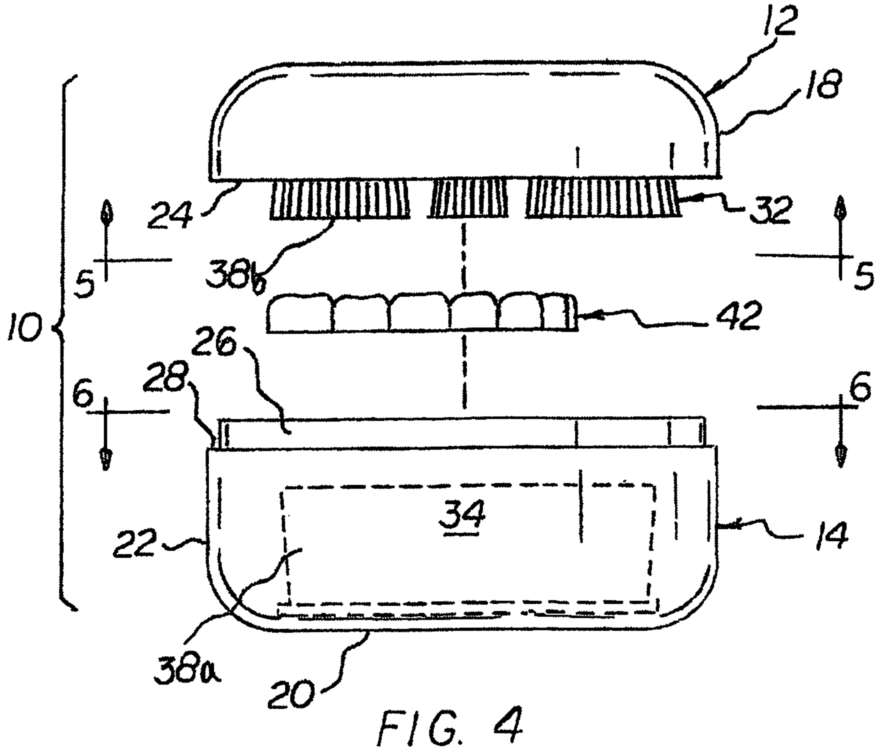
FIG. 4

FIG. 5
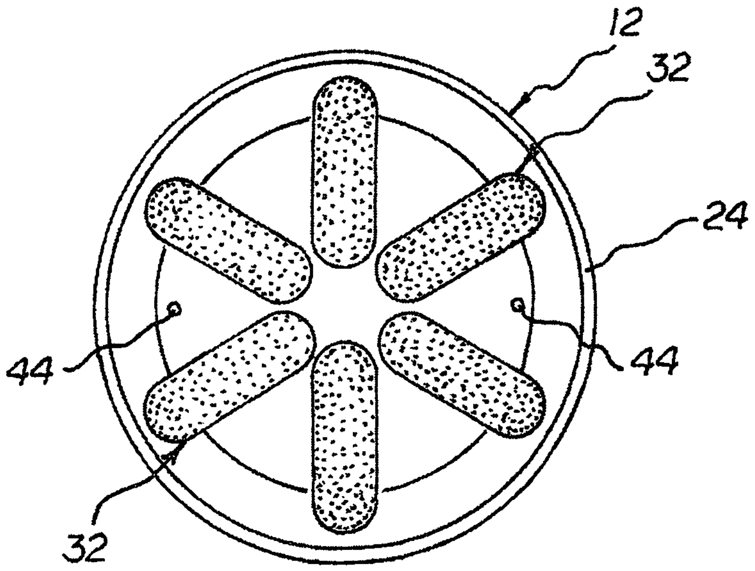
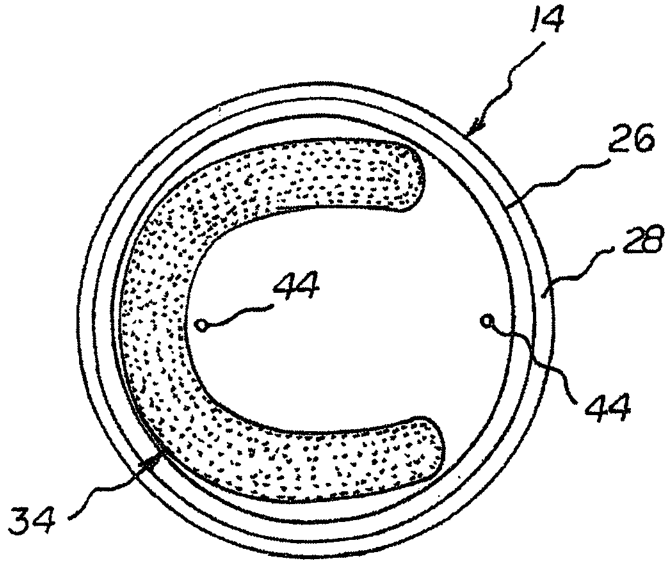
FIG. 6

COMBINED CONTAINER AND ORTHODONTIC RETAINER CLEANING APPARATUS

This application claims priority to provisional application Ser. No. 63/543,954, filed Oct. 13, 2023, and provisional application Ser. No. 63/576,366, filed Feb. 9, 2023. The entire contents of each of these applications are incorporated herein by reference.

BACKGROUND

Field of the Invention

This application relates to dental appliances, and more particularly, to a combined container and orthodontic retainer cleaning apparatus.

Background of Related Art

Orthodontic retainers are indicated for intermittent wearing. Oftentimes, they are put in at night and removed in the morning where they need to be cleaned and stored. Currently, users will place the retainer in a cup or container and add a liquid or tablet cleaner to the water in which the retainer is immersed. After soaking in the cleaning solution for a period of time, the retainer is removed and then placed in a storage container until the next use. Such method has several disadvantages. One main disadvantage is that simply soaking in the solution might not be sufficient to remove debris or dirt and fully clean the retainer. Further, this method requires cleaning the retainer in one container and then moving it to another container for storage.

In another method, the retainer is removed and the user scrubs it with a toothbrush. This has the disadvantage of requiring holding and handling the retainer during cleaning. After such brushing, the retainer needs to be placed in a storage container.

The need exists for an improved way to clean and store orthodontic retainers.

SUMMARY OF INVENTION

The present invention overcomes the deficiencies and disadvantages of the prior art. The present invention is directed to a combined container and cleaning apparatus for orthodontic/dental appliances such as plastic retainers.

More specifically, the present invention provides a portable container for housing an orthodontic retainer, wherein the container has first and second opposed top and bottom portions, e.g. cup-like portions, adapted to be rotatably joined together, preferably along opposed diametrical edges, and wherein separate cleaning-brush arrays are mounted in each of the portions for engagement with the orthodontic retainer disposed therein.

In use, the retainer is placed in one of the two portions, supported distally on the brush array in the selected portion in which it is placed (preferably the bottom portion). Next, a dentifrice or similar cleaning solution is placed on the supported retainer and/or the brush arrays. The top and bottom portions are then brought together and engaged together along their confronting diametrical annular edges to form a closed container with relatively rotatable upper and lower portions. In some embodiments, the top and bottom portions can lock together. Finally, in such closed condition, one or both of the top and bottom portions are rotated relative to the other sufficiently to cause the brush arrays to vigorously frictionally engage the enclosed retainer thereby cleaning the retainer. Following rinsing and drying of the retainer and the two portions, the retainer may then be placed back into one of the two portions and then the portions are closed to formed a closed container for storage. The container and its components/features are discussed in more detail below.

In accordance with one aspect of the present invention, a container for cleaning an orthodontic appliance is provided comprising a first component (portion) having a first set of bristles arranged in a first array and a second component (portion) having a second set of bristles arranged in a second array, the second set of bristles extending toward the first set of bristles when the container is in a closed condition. The first component is rotatable relative to the second component to clean the orthodontic appliance positioned within the container.

In some embodiments, the container further includes a locking mechanism for locking the first and second components together to secure the components during rotation of the first component relative to the second component. In some embodiments, the locking mechanism comprises a post received within a receiver, the receiver including a plurality of fingers biased inwardly in a locking position, and expandable by the post when initially inserted into the receiver. The locking mechanism preferably maintains at least some of the first set of bristles and/or at least some of the second set of bristles in continuous contact with the retainer.

In some embodiments, the array of the first set of bristles is different than an array of the second set of bristles; in other embodiments, the array of the first set of bristles is the same as the array of the second set of bristles. Such bristle difference can be in array, groupings, distances, height, number, etc.

In some embodiments, the bristles of the first set of bristles are of different heights and/or the bristles of the second set of bristles are of different heights. In some embodiments, at least two of the bristles of the first set of bristles and at least two of the bristles in the second sect of bristles increase in height in a direction toward a periphery of the container.

In some embodiments, the first component has a first cavity and the second component has a second cavity, the first set of bristles extending within the first cavity and terminating distally at a region proximal of a distalmost edge of the first cavity and the second set of bristles extending within the second cavity and terminating distally at a region proximal of a distalmost edge of the second cavity.

In some embodiments, the distal tips of the first set of bristles and/or distal tips of the second set of bristles extend in an imaginary line forming a substantially sinusoidal wave.

In some embodiments, the first component includes a first housing and a first support plate positioned within the first housing, the first set of bristles extending downwardly from the first support plate. In some embodiments, the second component includes a second housing and a second support plate positioned within the second housing, the second set of bristles extending upwardly from the second support plate. In some embodiments, one or both of the first support plate and second support plate are removably attachable to the first and second housing, respectively.

In accordance with another aspect of the present invention, a container for cleaning an orthodontic appliance is provided comprising a first component having a first set of bristles and a second component having a second set of bristles, the second set of bristles extending toward the first set of bristles when the container is in a closed condition. The first set of bristles is different than the second set of bristles. The first component is releasably lockingly engageable with the second component to clean and store the orthodontic appliance as the first and second sets of bristles frictionally engage the orthodontic appliance on opposite sides.

In some embodiments, the locking mechanism comprises a locking post engageable with a receiver in a male-female engagement when the first and second components are engaged. The receiver in some embodiments can include a plurality of fingers having shoulders to blockingly engage a flange of the locking member. It is envisioned that more than one locking member, locking post, etc. could be provided.

The first component can include in some embodiments a first housing and a first support plate positioned within the first housing, the first set of bristles extending downwardly from the first support plate. In some embodiments, the second component can include a second housing and a second support plate positioned within the second housing, the second set of bristles extending upwardly from the second support plate.

In some embodiments, the bristles of the first set of bristles are of differing heights and/or the bristles of the second set of bristles are of differing heights. In some embodiments, at least several bristles of the first set of bristles taper in height toward a periphery of the container and/or at least several bristles of the second set of bristles taper in height toward a periphery of the container. In some embodiments, at least several bristles of the first set of bristles taper in height toward a center of the container and/or at least several bristles of the second set of bristles taper in height toward a center of the container.

In accordance with another aspect of the present invention a container for cleaning an orthodontic appliance is provided comprising a first component having a first housing and first set of bristles arranged in a first array, the first set of bristles removably attached to the first housing. A second component has a second housing and a second set of bristles arranged in a second array, the second set of bristles extending toward the first set of bristles when the container is in a closed condition. The second set of bristles is removably attached to the second housing. The first component and the second component are placed in apposition to provide a closed container.

BRIEF DESCRIPTION OF THE DRAWINGS

So that those having ordinary skill in the art to which the subject invention appertains will more readily understand how to make and use the apparatus (device) disclosed herein, preferred embodiments thereof will be described in detail hereinbelow with reference to the drawings, wherein:

FIG. 1 is a perspective elevational view showing the combined container and orthodontic retainer cleaning apparatus of the present invention in a closed condition.

FIG. 2 is a top plan view of the apparatus taken along line 2-2 of FIG. 1.

FIG. 3 is a cross-sectional view in elevation taken along line 3-3 in FIG. 2 and schematically showing an orthodontic appliance (e.g., a retainer) supported distally on the tips of the bristles of a brush array in the bottommost cup-like portion of the container of FIG. 1.

FIG. 4 is an exploded elevational assembly view of the parts of the apparatus of FIG. 1.

FIG. 5 is a plan view taken along line 5-5 of FIG. 4 depicting an embodiment of the brush-array pattern in the top-most cup-like portion of the apparatus of FIG. 1.

FIG. 6 is a plan view taken along line 6-6 of FIG. 4 depicting an embodiment of the brush-array pattern in the bottom-most cup-like portion of the apparatus of FIG. 1.

DETAILED DESCRIPTION OF THE PREFERRED EMBODIMENTS

Figure 7:
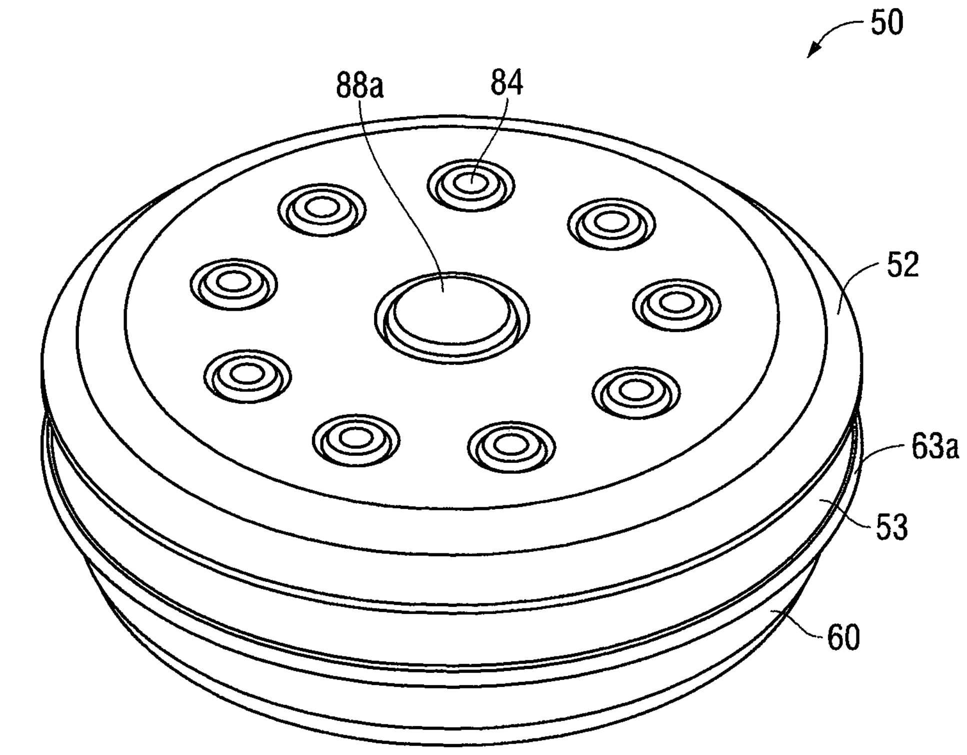
FIG. 7 is a top perspective view of an alternate embodiment of the combined container and orthodontic retainer cleaning apparatus of the present invention, the apparatus shown in a closed condition.
Figure 8:
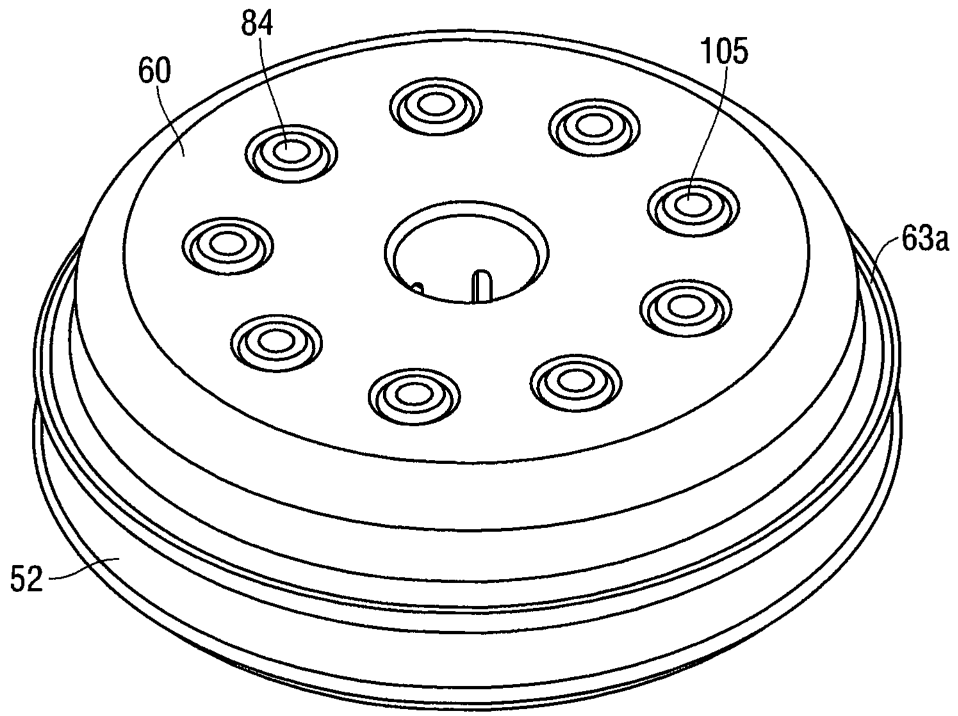
FIG. 8 is a bottom perspective view of the apparatus of FIG. 7.
Figure 9A:
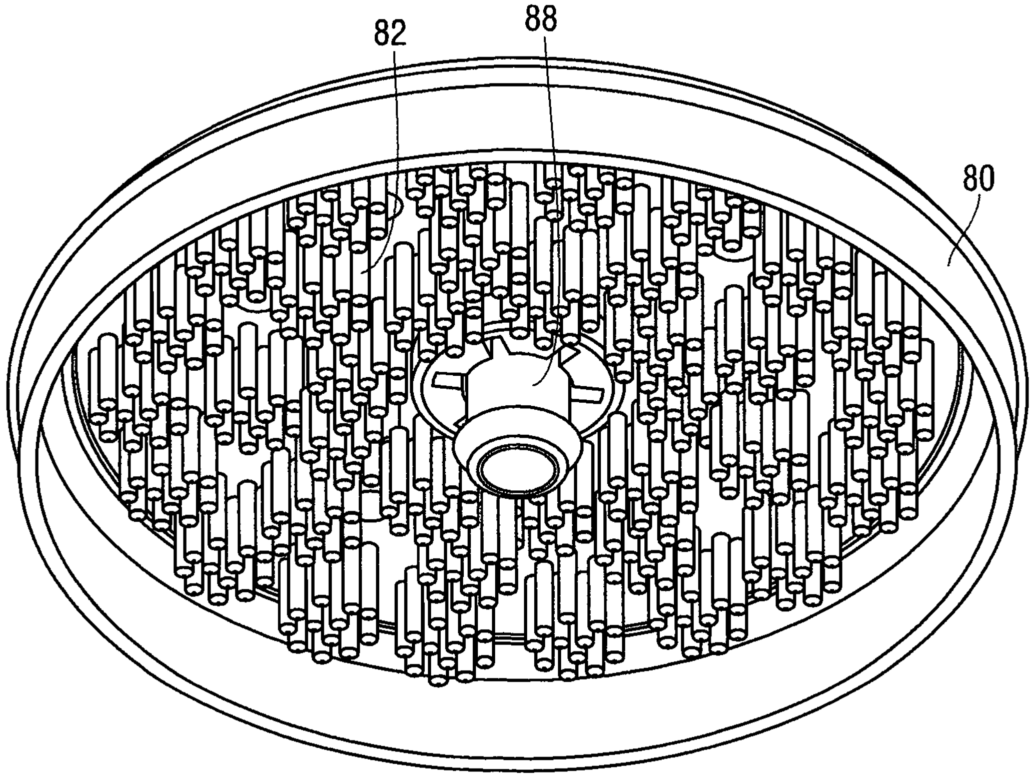
FIG. 9A is a bottom perspective view of the top portion (top component) of the apparatus of FIG. 7 showing one embodiment of an array of bristles (brushes) supported therein.
Figure 9B:
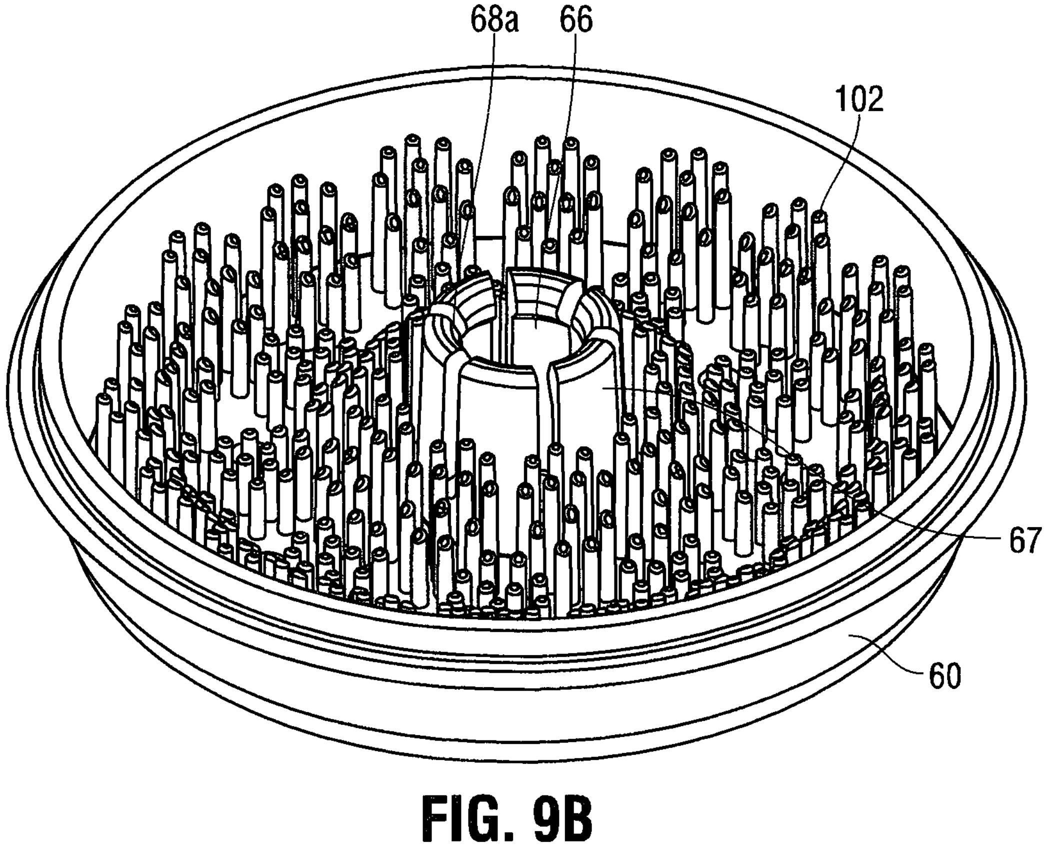
FIG. 9B is a top perspective view of the bottom portion (bottom component) of the apparatus of FIG. 7 showing one embodiment of an array of bristles (brushes) supported therein.

The present invention is directed to an apparatus for both storing and cleaning an orthodontic retainer. More specifically, the apparatus (device) forms a combined storage container and cleaning apparatus. The apparatus comprises a top component or portion, a bottom component or portion and an array of brushes (bristles) supported in each of the top and bottom components which engage with the retainer positioned between the two arrays of brushes. The top and bottom components are movable, i.e., rotatable, relative to each other to provide the bristles with frictional engagement and interaction with the retainer to thereby provide a brushing action to clean the retainer contained therein. Details of the top and bottom components and their use are described below.

Further, the present invention in some embodiments includes a locking mechanism to releasably interlock the top and bottom components to facilitate storage and use. This is also discussed in more detail below.

The top and bottom components can have various arrays/arrangements of bristles, several of which are illustrated in the drawings by way of example.

Note as used herein the term “lower” or “bottom” refers to the portion or region placed on a surface such as a shelf, counter or table and the term “upper” or “top” refers to the portion or region of the device placed over the bottom portion forming a cover. Note if the orientation changes from that of FIG. 4 or 12, these lower and upper designations would also change accordingly. Further as used herein, with regard to each component, the term "distal" refers to the part extending away from the component toward the other component, e.g., the bristles extending distally from their respective component in a direction toward the bristles of the other component. The term "proximal" with regard to each if the components is the portion opposite "distal."

Further note that the apparatus is described herein and shown in the drawings for cleaning an orthodontic article comprising a plastic retainer 42 and then storing the retainer 42. However, it should be appreciated that the apparatus can also be utilized to clean and/or store other articles as well, including those used in dentistry or otherwise.

Referring now to the drawings and particular embodiments of the present disclosure, wherein like reference numerals identify similar structural features of the apparatus throughout the several views, the combined container and cleaning apparatus (also referred to herein more simply as "the apparatus" or "the device") of a first embodiment of the present invention is illustrated in FIGS. 1-6 and designated generally by reference numeral 10. With initial reference to FIGS. 1-3, apparatus 10, in the closed condition, is in the form of a closed hollow container. Container 10 is preferably round in horizontal cross-section (FIG. 2) and has two confronting generally cup-shaped (cup like) parts (components): a top cover part 12 (also referred to herein as the cover) and a bottom base part 14 (also referred to herein as the base).

More specifically, top cover part 12 includes a housing having a substantially flat top wall 16 (FIG. 3) and a substantially cylindrical or annular sidewall 18. Similarly, bottom base part 14 includes a housing having a flat bottom wall 20 and a substantially cylindrical or annular sidewall 22. Note that this cylindrical shape is one example of the shape of the apparatus, it being understood that other shapes are also contemplated, including non-round, symmetrical or asymmetrical, etc.

Sidewall 18 of top cover part 12 terminates distally (the region closer to the base 14) in an annular end edge 24 whereas sidewall 22 of bottom base part 14 terminates distally (closer to the top cover 12) in an inner radially offset annular wall portion 26 defining an outer radial annular shoulder or lip 28. By this construction, when container 10 is in a closed condition, the annular sidewall 18 of top cover part 12 is adapted to interfit and to register with the annular sidewall 22 of bottom base part 14 such that the distal annular edge 24 of cover 12 rests upon annular shoulder 28 of base 14 and the inner portion **18*a* of the sidewall 18 proximal to shoulder 28 bears against (abuts) the outer surface 26*a* of inner radially offset wall portion 26, as depicted in FIG. 3. In other words, the distal annular edge 24, the annular shoulder 28, the inner portion 18*a* of the sidewall 18 proximal to shoulder 28, and the outer surface 26*a* of inner radially offset wall portion 26, together constitute annular bearing surfaces enabling the cup-like parts 12, 14 to be interengaged with one another (closed) while being allowed to rotate relative to each other. It should be appreciated that alternatively sidewall 22 of bottom part 14 could terminate distally in an annular edge whereas sidewall 24 of top part 12 could terminate distally in a radially offset annular wall portion defining an outer radial annular shoulder or lip to provide engagement similar to that of FIG. 3 (i.e., the reverse construction of FIG. 3**).

Preferably, the interengagement between the top cover part 12 and the bottom base part 14, when the container 10 is in the closed condition, is snug, but loose enough to easily facilitate manual rotation of the container top part 12 relative to the container base part 14 either clockwise or counter-clockwise about the container's central axis L as indicated schematically by arrow 30 (FIG. 1). That is, once engaged so the container 10 is in the closed condition, the top part 12 and/or bottom part 14 can be grasped by the individual and rotated in either direction to effect cleaning of the orthodontic retainer contained inside by engagement by the multiple arrays of brush bristles as described herein. Note as used herein, relative rotation or relatively rotatable encompasses rotation of the top part as the bottom part remains stationary, rotation of the bottom part as the top part remains stationary and/or rotation of both the top part and bottom part.

Both the bottom part 14 and top cover 12 can have one or more small drainage openings (FIGS. 5 and 6) 44 to facilitate drying after the container is rinsed and ventilation during cleaning of the retainer and storage. Two drainage openings are shown in the base 14 and cover 12 in the illustrated embodiment although a different number, size and placement could be provided.

In a further aspect of the invention, separate top and bottom arrays (patterns) or formations of cleaning brushes 32, 34 are securely mounted within the cavity defined by the interior of top cover part 12 and the interior of bottom base part 14, respectively. The arrays in the top and bottom portions 12, 14 can be the same, mirror images of each other, or can differ in arrangement/groupings, number, height, and/or thickness. Some examples of arrays are described herein and illustrated in the drawings.

Preferably, in apparatus 10, each cleaning brush array comprises an agglomeration of brush bristles 38 suitably affixed to a substantially flat base member or plate 40. More specifically, plate **40*a* is positioned within base part 14 and has brush bristles 38*a* extending upwardly therefrom in a direction toward the top cover part 12 and plate 40*b* is positioned within top part 12 and has brush bristles 38*b* extending downwardly therefrom in a direction toward the bottom part 14. (The brush bristles 38*a*, 38*b* are collectively referred to herein as brush bristles 38). One or more of the bottom brush bristles 38*a* and/or top brush bristles 38*b* can extend substantially perpendicular to their respective plate 40 and/or at an acute angle to their respective plate. The bristles 38** can also be arranged in spaced apart groupings as discussed below.

With respect to the top cover part 12, the top bristle brush array 32 has base plate **40*b* suitably attached to the underside (downwardly facing surface) of flat top portion 16 (as by using fasteners or a suitable adhesive, for example) whereas with respect to the bottom part 14, bristle brush array 34 has its base plate 40*a* suitably attached to the inside (upwardly facing surface) surface of bottom wall 20. In some embodiments, the base plate 40*b* and/or base plate 40*a* can be removably attached to the respective top and bottom portions 16, 14** by fasteners, adhesive or other methods to enable the brushes to be replaced if desired.

Cleaning brush arrays 32, 34 are preferably constructed of the same materials, and in the same manner, as in toothbrushes, although other constructions and materials are also contemplated.

As best seen in FIGS. 3 and 4, retainer 42 can be supported between upper and lower brush arrays 32, 34 when the container 10 is closed so as to enable the distal tips of the brush bristles 38 to frictionally engage and thereby clean the retainer 42 while the top and bottom parts 12, 14 are being rotated back and forth as indicated by arrow 30 in FIGS. 1 and 2. That is, the distal tips come into contact with and apply a frictional force to the surfaces of the retainer to perform a retainer cleaning function.

In the illustrated embodiment, cover 12 of container 10 is shallower than base 14, and the bristles 38*b* of upper brush array 32 extend beyond the sidewall edge 24 (distalmost edge) of cover 12. In contrast, the base part 14 is deeper than top cover 12, and the bristles of lower brush array 34 terminate at a lower height than the extremity (distalmost edge) of wall portion 26. This arrangement enables the retainer 42 to be seated on the bristle tips of lower brush array 34, below the diametrical engagement edges or surfaces of cover 12 and base 14, i.e., below the shoulder/edge engagement, in such a way as to be embedded on the top of brush array 34 among the tips of the brush bristles 38*a*, as schematically depicted (FIGS. 3 and 4). The bristles 38*b* and/or bristles 38*a* can vary in height or be of the same or substantially the same height.

Note that as an alternative to the illustrated position and configuration of the bristles 38, the geometrical form of the bristle brush arrays 32, 34 can be different from one another, which can in certain applications enhance the efficiency of the cleaning process effected by the apparatus of the present invention by promoting contact of the bristle brush tips with all surfaces on the article being cleaned, and rendering the device easy to manually operate.

For example, in this regard, FIGS. 5 and 6 show by example an alternate embodiment of the brush arrays wherein, the brush array 32 mounted in the interior of the top cover part 12 is comprised of individual oblong-shaped segments arranged in a "star-burst" pattern, with the oblong shapes extending radially outwardly from a region closer to the center toward a circumferential edge of the top part 12. The brush array 34, in contrast, is mounted in the interior of the base part 14 and comprises a unitary "arch-shaped" array 34 mimicking or substantially mimicking the shape of an orthodontic retainer or like article, depicted. It should be appreciated that the brush arrangement can be reversed so the arch shape is in the top part 12 and the star-burst pattern/array is in the bottom part 14. The bristles of bottom brush array 34 can be of uniform height along their arc or can vary in height along their arc. For example, the bristles in the legs of the U-shape can have a greater height than the curve of the U. The bristles of the brush array 32 of the top part 12 can be of the same height along its length or alternatively can vary in height along its length, e.g., the bristles closer to the center can have a smaller height than the bristles closer to the periphery or vice versa. Additionally, the various oblong shapes can all be of the same height or one or more of the oblong shapes can be of a different height.

The height variations of the bristles discussed herein of the various embodiments can be achieved by varying the length of the bristles (in a proximal to distal direction) or by varying the height of the plates 40*a*, 40*b* so the plates are not planar but some regions have a greater height or thickness than other regions.

The bristles can extend perpendicularly as shown in FIGS. 3 and 4 or alternatively can be at an acute angle with respect to the inner wall of the top and bottom part 12, 14 from which the bristles extend.

Further, it should be appreciated that these brush array patterns (and groupings, sizes, etc.) are just one example of a brush array in the top and bottom components 12, 14 so that other shapes, sizes, configurations and arrangements can also be utilized. Further, it should be appreciated that as noted above the brush arrangement can be reversed so the arch shape is in the top part 12 and the star-burst shape is in the bottom part. The exact shape and/or arrangement of the brush arrays 32, 24 can also be provided to accommodate the specific shape of the article to be cleaned. Additionally, in some embodiments, the array and bristles are configured so that the article, e.g., retainer, is able to move around a bit within the container which could reduce the chances of it getting stuck in the flat bristles.

The use of the container 10 will now be described, it being understood that the container of the other embodiments disclosed herein would be used in the same manner:

Step 1. A cleaning solution or dentifrice is applied to the article being cleaned (e.g., retainer) and/or to the tips of the bristles of the brush arrays in the cover and base parts of the container.

Step 2. The article being cleaned (e.g., retainer) is placed preferably face-down on the bristle tips of the brush array in the bottom base part of the container.

Step 3. The container is closed by interfitting the cover part with the base part (with the shoulder engagement as described above).

Step 4. With both hands holding the cover and base closed, one or both of these two components are rotated vigorously relative to each other in a back-and-forth motion about the central rotation axis of the closed container.

Step 5. The container is opened and the retainer is withdrawn and rinsed off.

Step 6. The cover and base parts of the container including the brush bristles are rinsed off and allowed to dry. (The small drainage openings 44 in the cover and base parts facilitate drying and ventilation).

Step 7. Optionally, the retainer may be placed back into the closed, dry container for convenient storage thereof.

FIGS. 7-12 illustrate an alternate embodiment of the container of the present invention. The container 50, like container 10 of the embodiment of FIGS. 1-6, provides for storage and cleaning of an article such as an orthodontic retainer. The container 10 has a top cover part (component) 52 having a top housing and a bottom base part (component) 60 having a bottom housing, and when in the closed condition of FIGS. 7 and 8 form a disk-like container. The bottom part 60 has a lip 63*a* engaged by the top cover 52 in the manner described below with respect to FIG. 12. Further note that in the illustrated embodiment, the diameter of the top cover 52 is slightly greater than the diameter of the of the bottom part 60, except for the lip 63*a* which extends outwardly with respect to the outer circumference of the top cover 52. The bottom part 60 is configured to sit on a surface such as a counter, table, shelf, etc.

Figure 11:
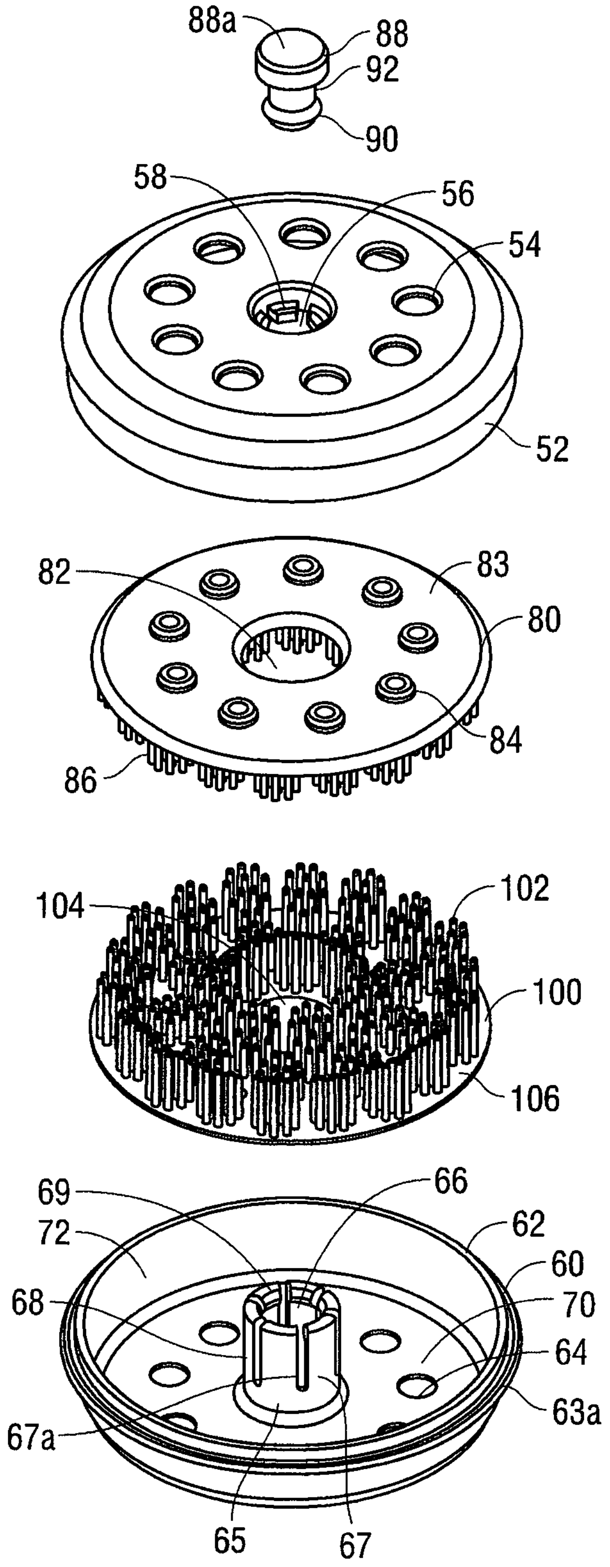
FIG. 11 is an exploded view of the apparatus of FIG. 7 showing the unassembled components.

With reference to the exploded view of FIG. 11, a brush support plate 80 (also referred to herein as the upper plate 80) is mounted within a cavity of the housing of the top cover 52 with the top surface 83 of the upper support plate 80 facing the top cover 52 and in preferred embodiments abutting the lower surface of the top cover 52. Support plate 80 includes a plurality of spaced apart fastening elements 84 arranged in a circular array which engage and extend into the corresponding circular array of holes 54 of top cover 52 to secure support plate 80 to the cover 52. The top support plate 80 is circular in configuration to fit within the circular shaped cavity of the top part 52. A different number of fasteners/fastening elements (and corresponding holes) are also contemplated. It should also be appreciated that the frictional engagement of the fasteners 84 and holes 54 are one example of how to attach the top support plate 80 to the top cover 52 as other ways of attachment are also contemplated.

A central opening 82 in support plate 80 is aligned with a central opening 56 of top plate 52 to receive locking member 88 therethrough. An upper brush array 86 formed by a plurality of bristles 87 extends downwardly from the lower surface of support plate 80. The bristle configuration is discussed in more detail below.

With continued reference to FIG. 11, bottom part (base) 60 has a housing with an upper surface 70 on which support plate 100 is mounted, preferably such that the lower surface of support plate 100 abuts the upper surface 70. Support plate 100, like support plate 80, includes a plurality of fastening elements 105 (FIG. 8) arranged in a circular array which engage and extend into the circular array of holes 64 of bottom part 60 to secure support plate 100 to the bottom part 60. It should be appreciated that the frictional engagement of the fasteners 105 and holes 64 are one example of how to attach the bottom support plate 100 to the bottom part 60 as other ways to attach the plate 100 and bottom part 60 are also contemplated.

It should be noted that the top support plate 80 and/or the bottom support plate 100 can be permanently attached to the respective bottom part 60 and top part 50 in manufacture. However, in alternate embodiments, the top support plate 80 can be removably attached to the top part 52 and/or the bottom support plate 100 can be removably attached to bottom part 60. Such removable engagement enables the brushes/bristles to be replaced after a period of use or if the user wishes to substitute a different brush/bristle arrangement for certain uses. That is, in such embodiments, it is envisioned that more than one bristle arrangement can be provided, different in size, thickness, softness, etc. so that the user can select the appropriate/desired bristle arrangement which can in some embodiments be indicated for particular uses or applications. Such different arrangement can be packaged/sold separately from the container so they are offered individually or can be provided in a kit with the container 50 (or container 10).

Figure 12:
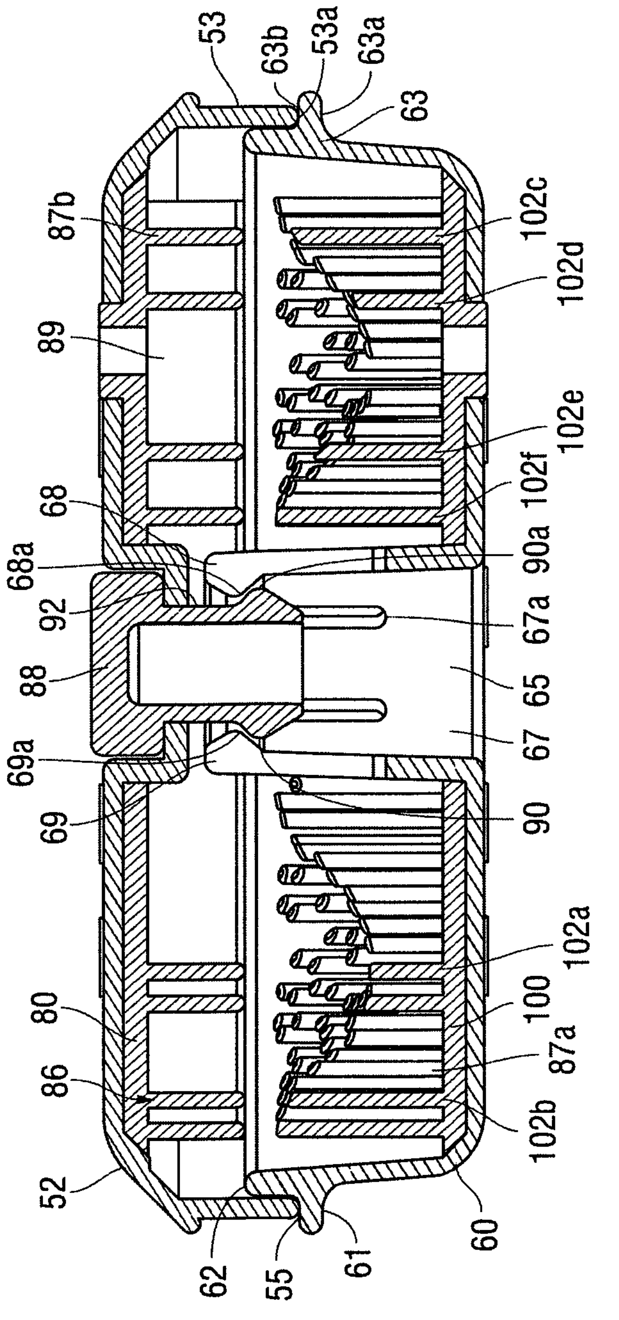
FIG. 12 is a cross-sectional view of the apparatus of FIG. 7 showing the interlocking of the top and bottom portions.

As best shown in FIG. 12, top part 52 terminates distally (the region closer to the base part 60) in an annular edge 53 whereas sidewall 63 of bottom base part 60 terminates distally (closer to the top cover 52) at end 62 and has an inner radially offset annular wall portion 63*a* defining an outer radial annular shoulder or lip (see also FIG. 7). By this construction, when container 10 is in a closed condition, the annular edge 53 of top cover part 52 is adapted to interfit and to register with the annular sidewall 63 of bottom base part 60 such that the distal annular surface (inner wall surface) 53*a* of edge 53 rests upon upper surface (outer wall surface) 63*b* of the annular lip defined by annular wall portion 63*a*. That is, the inner wall surface 53*a* of annular edge 53 abuts the outer wall surface 63*b* of sidewall 63 as shown in FIG. 12. This construction provides for a closed container while still allowing relative rotation of the top part 52 and bottom part 60.

In the embodiment of FIGS. 7-12, the top part 52 and bottom part 60 are locked together by a locking mechanism in a male/female interengagement. As shown in FIGS. 11 and 12, the releasable locking mechanism includes a locking member 88 and a receptacle (receiver) 65. Locking member 88 of the locking mechanism extends downwardly from the top cover 52, preferably perpendicularly therefrom, although other angles are contemplated, in a direction toward the bottom part 60, extending distally of the transverse plane of the distalmost end of top support plate 80. The locking member 88 is in the form of a post, cylinder-like shape, extending into the longitudinally extending opening 66 in the upwardly extending receptacle (receiver) 65 of the bottom part 60. The locking mechanism prevents separation of the top and bottom parts 52, 60 during handling and use, i.e., brushing/cleaning. By preventing such separation during rotational movement of one or both of the containers, the bristles of the brush arrays can maintain better, e.g., continuous, contact with the retainer during brushing/cleaning.

More specifically, locking member 88 includes a top surface 88*a*, a flange 90 and an annular slot or recess 92 proximal of the flange 90. Receiver 65 of the locking mechanism extends upwardly from the bottom surface 70 of bottom part 60 in a direction toward the top cover 52, preferably perpendicular to bottom surface 70 to correspond to the perpendicular locking member 88, although other angles are also contemplated. Receiver 65 includes a plurality of vertically extending arms of fingers 67, separated by slots 67*a* to provide flexibility. Flanges 69 on the distal portion of arms 67 form shoulders to engage annular flange 90, i.e., a lower surface 69*a* of flanges 69 engage an upper surface 90*a* of flange 90 to block upward (proximal) movement of the locking member 88. Thus, when the top part 52 is pressed into engagement with the bottom part 60, the locking member 88 extends within opening 66 of receiver 65 and applies a radial outward force to the arm/fingers 67 so that the locking member 88 can be pressed into receiver 65. Once within the receiver 65, the arms 67 return to their initial (e.g., more vertical position) with flanges 69 extending into annular slot 92 of locking member 88 and engaging the flange 90 to block retraction of the locking member 88 and thus prevent separation of the top part 52 from the bottom part 60. Note this interlocking secures the top part 52 and bottom part 60 from separation (detachment in an axial direction) but still enables rotation of the top part 52 and/or bottom part 60 relative to each other.

To separate the top part 52 and bottom part 60, the user applies a sufficient counterforce to the top part 52 in a direction away from the bottom part 60 (a proximal direction) to override flange 69, i.e., to force the arms 67 to flex radially outwardly so flanges 69 disengage from flanges 90 and can bypass flanges 69 for removal. The locking post 88 can be made of silicon to enable such release, although other materials are also contemplated.

Note that the locking mechanism comprising locking member 88 and receptacle (receiver) 65 is one example of how to interlock the two components as other releasable locking mechanisms to prevent component separation while still enabling rotation are also contemplated including other frictional engagements, latches, etc.

Figure 10A:
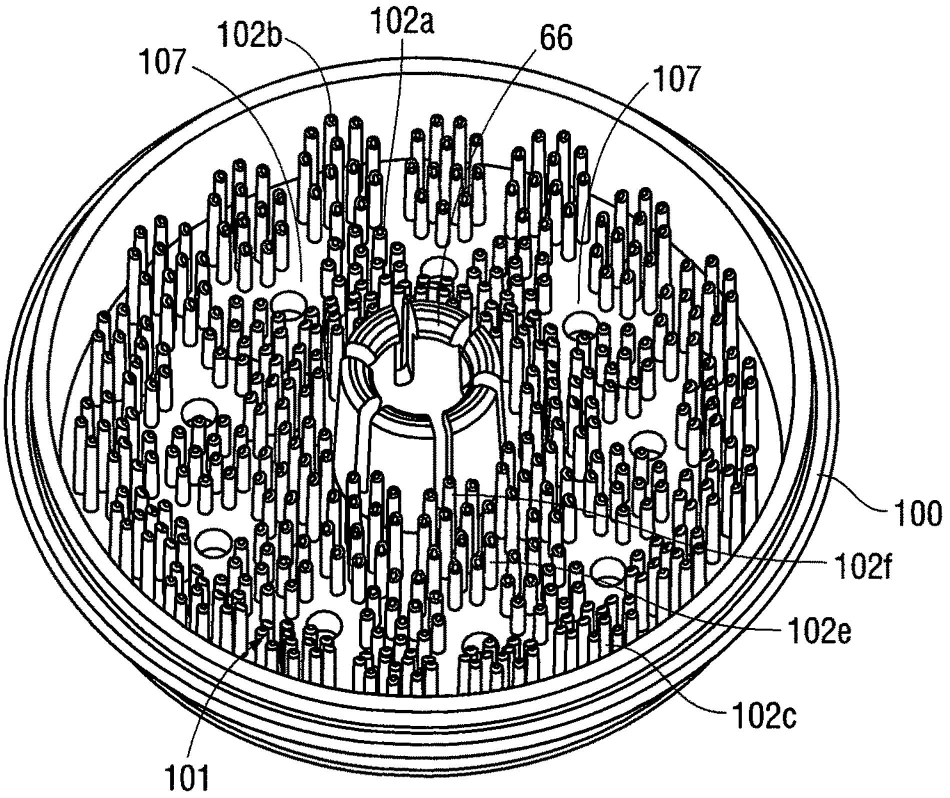
FIGS. 10A and 10B are perspective views showing the inside of the bottom and top components, respectively, of the apparatus of FIG. 7, the components shown before they are placed in the closed condition.
Figure 10B:
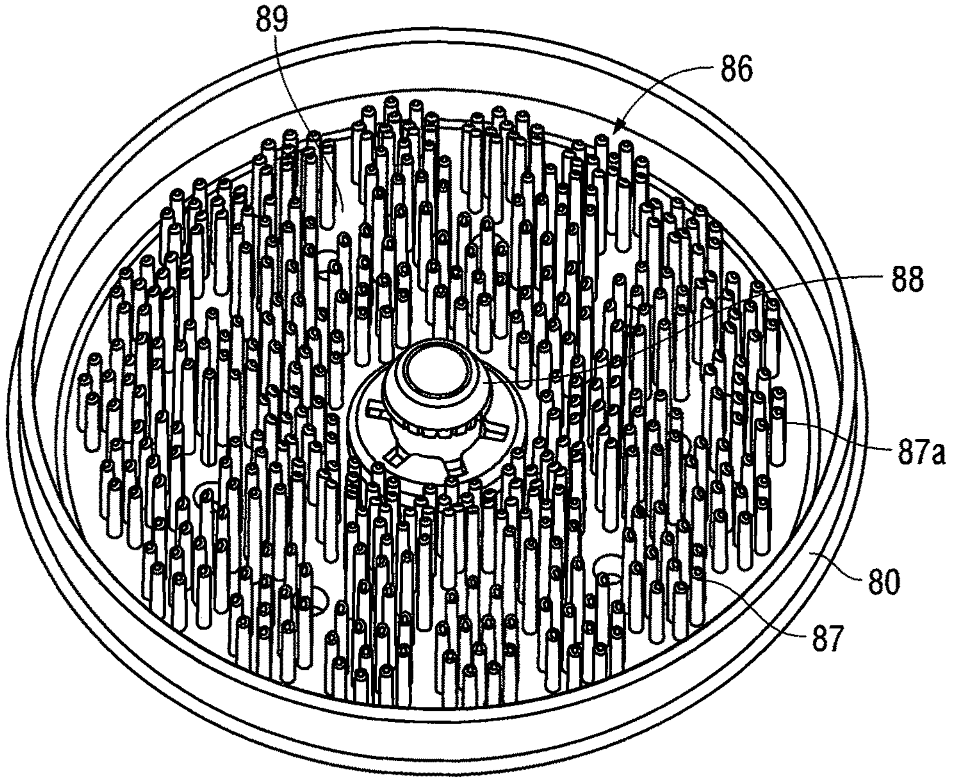

Turning now to the brush/bristle array of container 50, the lower brush array 101 is positioned on an upper surface of the support plate 100 and extends in a direction toward the top cover 52. The upper brush array 86 is positioned on a lower surface of support plate 80 and extends in a direction toward the bottom part 60. FIGS. 10A and 10B best illustrate the brush arrays 101, 87.

Lower brush array 101 has a plurality of bristles 102 arranged in groupings which are spaced apart. Within each grouping, multiple bristles 102 are provided, preferably between 8 and 12 bristles, although other numbers of bristles can be provided. The gap between the groupings is designated by reference numeral 107. Note that for clarity, only some of the bristles 102 and gaps 107 are labeled in FIG. 10A. In this embodiment, as best shown in FIG. 12, the bristles 102 are formed of different heights. For example, bristles 102*b*, further from the center of the bottom plate 100 can have a greater height than bristles 102*a* which are closer to the center. Further the bristles 102*b* can also be of different heights as shown, tapering in height toward the center. Likewise bristles 102*a* can be of different heights, tapering toward the center of the bottom part 60. On the opposing side of the centerline, bristles 102*f*, e.g., closer to the center, are of a greater height than bristles 102*e* further from the center while bristles 102*e* are of a greater height than bristles 102*d*. Furthest from the centerline, bristles 102*c* are a greater height than bristles 102*d* and 102*e* and can be of the same or a different height than bristles 102*f*. Note this arrangement can be for the collection of the bristles 102 as shown in FIG. 10A. When viewed in FIG. 12, the tips of the bristles 102 along an imaginary line from a sinusoidal shape. This in some circumstances can better accommodate the retainer in the container 50. Bristles 102*e*, 102*f* are further apart than adjacent bristles 102*a* in the illustrated embodiment although other arrangements and spacings are also contemplated.

It should be appreciated that the arrangement shown in the cross-section of FIG. 12 is due to the section of bottom plate 100 through which the section line is taken since as can be in seen in FIG. 10A, the bristle groupings are not symmetrical. Thus, in viewing the bristles along radii (i.e., spokes of the wheel), the "spokes" could have different number of bristles, depending on the location of the inner array of bristles 102. Stated another away, the support plate 100 can include an outer array of bristles 102, (placed in groupings of between about 8 and about 12 bristles for example) closer to the bottom plate 100 periphery and one or more inner arrays of bristles positioned between the outer array and central receptacle/receiver 65. The inner and/or outer array can be symmetrical or asymmetrical and can also have bristles in groupings of between about 8 and about 12 bristles. Intermediate array(s) of bristles can also be provided in some embodiments between inner and outer arrays.

Upper brush array 86 has a plurality of bristles 87 arranged in groupings which are spaced apart. Within each grouping, multiple bristles 87 are provided, preferably between 8 and 12 bristles, although other numbers of bristles can be provided. The gap between the groupings is designated by reference numeral 89. Note that for clarity, only some of the bristles 87 and gaps 89 are labeled in FIG. 10B. In this embodiment, as best shown in FIG. 12, the bristles 87 are of substantially the same height, although it is also envisioned that two or more of the bristles in a particular grouping, or compared to another grouping, can vary in height. By way of example, bristles 87 further from the center of the support plate 80 could have a greater height (or alternatively a shorter height) than bristles 87 closer to the center. Further, in alternate embodiments, the distal tips of bristles 87 along an imaginary line could form a sinusoidal shape like bristles 102. Bristles 87*b* are further apart from each other than bristles 87*a* in the illustrated embodiment although other arrangements and spacings are also contemplated.

It should be appreciated that the arrangement shown in the cross-section of FIG. 12 is due to the section of top plate 80 through which the section line is taken since as can be in seen in FIG. 10B, the bristle groupings are not symmetrical. Thus, in viewing the bristles along radii (i.e., spokes of the wheel), the "spokes" could have different number of bristles, depending on the location of the inner array of bristles 87. Stated another away, the support plate 80 can include an outer array of bristles 87, (placed in groupings of between about 8 and about 12 bristles for example) closer to the top plate 80 periphery and one or more inner arrays of bristles positioned between the outer array and middle post locking member 88. The inner array can be symmetrical or asymmetrical and can also have bristles in groupings of between about 8 and about 12 bristles. Intermediate array(s) of bristles can be provided in some embodiments between inner and outer arrays.

Note as shown in FIG. 12, the distal tips of top bristles 87 preferably terminate proximally of the distalmost edge (surface 53*a*) of the top part 52 and the bottom bristles 102 preferably terminate proximally of the distalmost edge (surface 63*b*) of the bottom part 60. Thus, the top bristles 87 lie above a plane of the distal end of the top part 52 and the bottom bristles 102 lie below a plane of the distal end of the bottom part 60.

The concave array of bristles 102 in the bottom part 60 of the container 50 help to prevent the retainer from getting caught and moving around. This also allows for brushing on the sides of the retainer. The top bristles 87 allow for cleaning/brushing of the interior of the retainer.

Figure 13A:
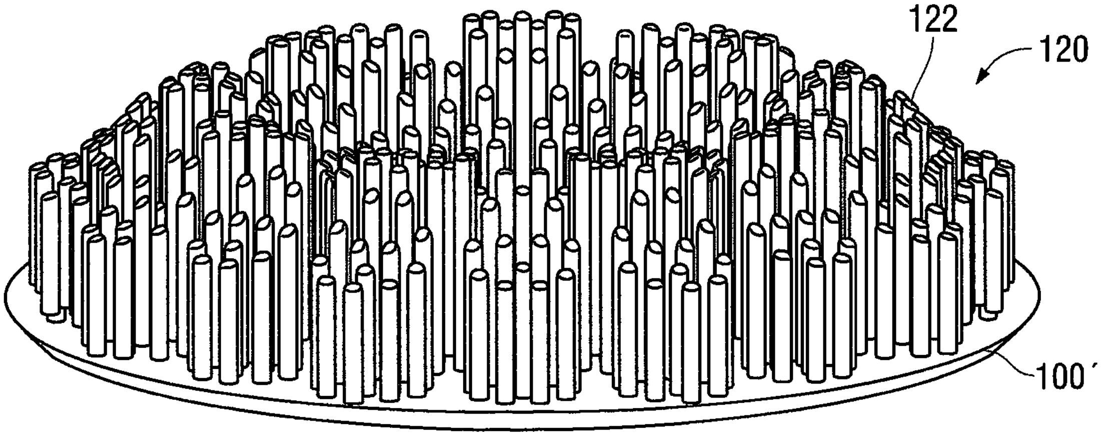
FIG. 13A is a perspective view of an alternate embodiment of the array of bristles in the top portion.
Figure 13B:
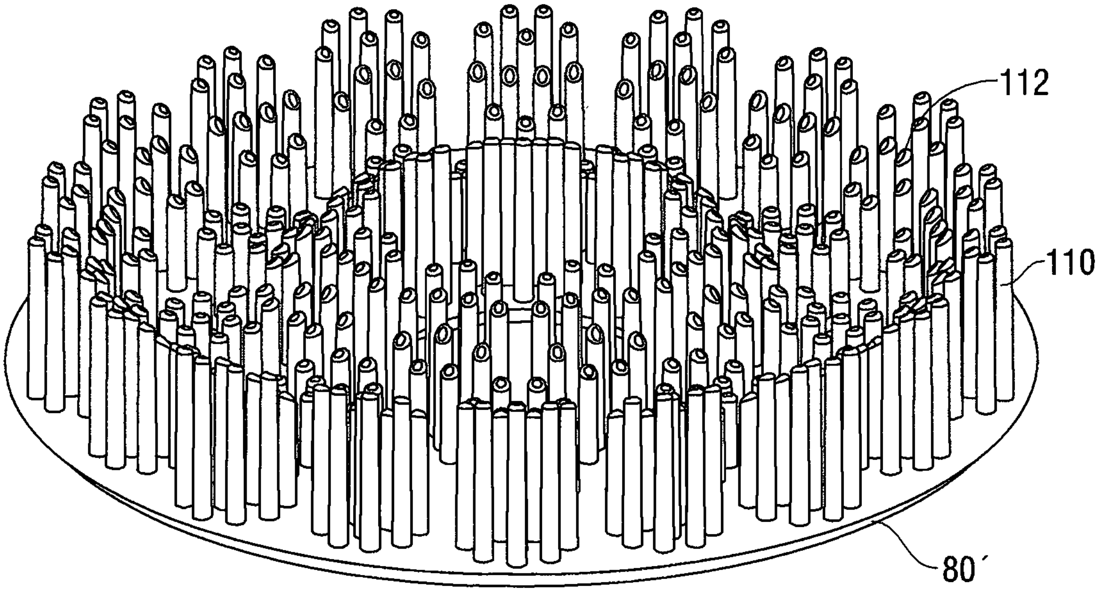
FIG. 13B is a perspective view of an alternate embodiment of the array of bristles in the bottom portion.
Figure 14:
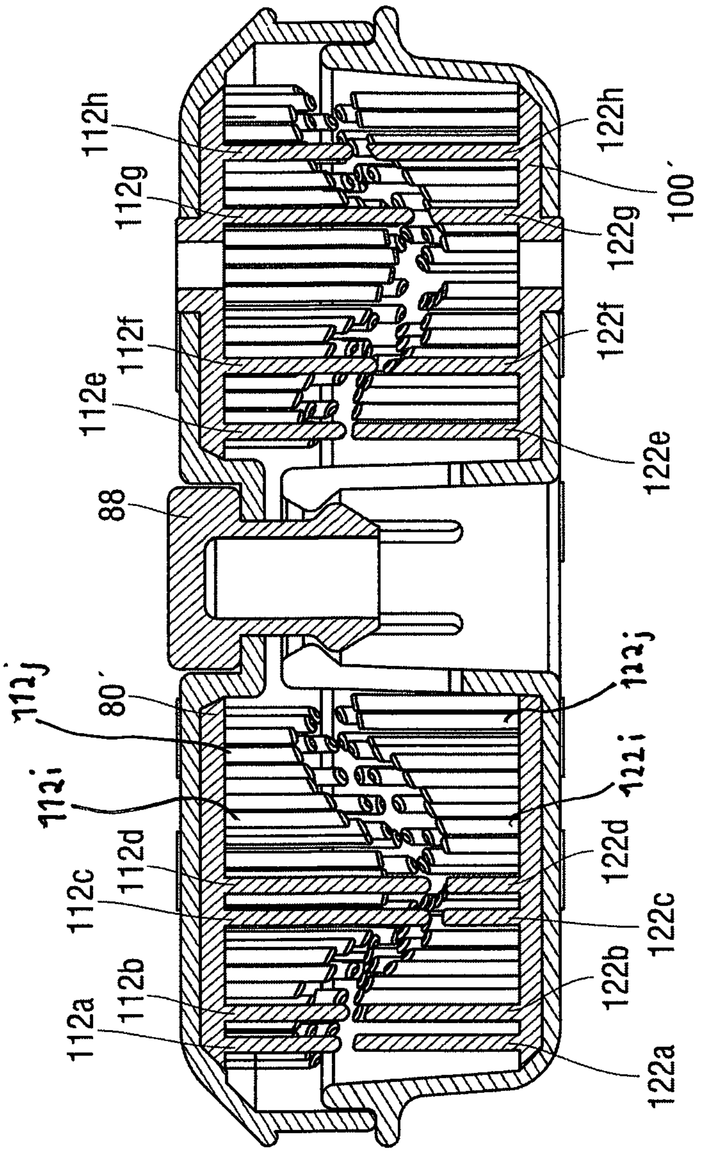
FIG. 14 is a cross-sectional view of the apparatus similar to FIG. 12 showing the top and bottom brush arrays of FIGS. 13A and 13B.

In the alternate embodiment of the container 50 shown in FIGS. 13A, 13B and 14, both the top brush array 110 and bottom brush array 120 have bristles of various heights. In the top brush array 110, the bristles (collectively referred to as bristles 112) on top support plate 80' increase in height toward the center, i.e., toward the locking post 88. Stated another way, the bristles 112*a*, 112*b* closer to the periphery have a shorter height than the bristles 112*c*, 112*d* further from the periphery which are closer to the center of plate 80'. Bristles 112*i* and 112*j* between bristles 112*d* and center post 88 have a height less than bristles 112*d* and can taper (reduce) in height toward post 88. In the illustrated embodiment, the height of bristles 112*a* is less than the height of bristles 112*b* and the height of bristles 112*c* is less than the height of bristles 112*d*. It should be appreciated that the heights of bristles 112 can vary from that shown. On the opposite side of the center of plate 80', the bristles 112*e* closer to the center have a shorter height than the bristles 112*e* further from the center and the bristles 112*h* closer to the periphery have a height less than height of bristles 112*g* further from the periphery. Bristles 112*h* can taper (reduce) in heigh toward the periphery. Bristles 112*g*, between bristles 112*f* and 112*h*, for example, can have a height greater than a height of bristles 112*e*, 112*f* and 112*h*. It should be appreciated that the heights and tapers can vary from that shown.

The bristles of lower brush array 120 on lower plate 100' (collectively referred to as bristles 122) are configured to complement the bristles 112 of upper brush array 110 in that where a bristle 112 has a reduced or increased height, the opposing bristle 122 has a respective increased or reduced height. Thus, in the illustrated embodiment, the bristles 122*a* closer to the periphery have a greater height than the bristles 122*b* further from the periphery (closer to the center of plate 80') which have a height greater than height of bristles 122*c* which have a greater height than bristles 122*d*. Bristles 122*i* and 122*j* between bristles 122*d* and the center of plate 80' have a height greater than bristles 122*d* and taper (reduce) in height away from the center of plate 80'. It should be appreciated that the heights of bristles 122 can vary from that shown. On the opposite side of the center of plate 100', the bristles 122*e* closer to the center have a greater height than the bristles 122*f* further from the center which have a greater height than bristles 122*g* closer to the periphery. Bristles 122*h* close to the periphery have a height greater than the height of bristles 122*g* and can also be greater in height than the height of bristles 122 and can taper (reduce) in height in a direction toward the center of lower plate 100'. It should be appreciated that the heights and tapers can vary from that shown.

As noted above with respect to FIG. 12, the arrangement shown in the cross-section of FIG. 14 is due to the section of top plate 80' and bottom part 100' through which the section line is taken.

It is also envisioned that the heights can be the reverse of that shown in that the bristles 112*a*-112*h* would have the height and tapers of bristles 122*a*-122*h* and the bristles 122*a*-122*h* would have the height and tapers of bristles 112*a*-112*h*.

As in the embodiment of FIG. 12, the bristle tips of the brush arrays 110, 120 of FIG. 14 along an imaginary line can form a substantially sinusoidal shape and have a concavity as in the embodiment of FIG. 12. More specifically, as best shown in FIG. 14, the bottom bristles 122 form a concavity between the center and the periphery while the top bristles 112 from a convexity complementing the concavity, i.e., have the opposite pattern. Thus, in the bottom portion, the bristles reduce in height from the periphery and then increase in height to the center while in the bottom portion, the bristles increase in height from the periphery and then decrease in height to the center. In an alternate embodiment, the bottom bristles 122 form a convexity and the top bristles form a convexity.

It should be understood, as noted above, the arrays, groupings, number, height, spacing, tapers, etc., of the bristles in the top and bottom parts (components) can vary from that shown. The arrays could be symmetrical or asymmetrical and the grouping of bristles can be different than that shown.

The bristles of the various embodiments disclosed herein can extend perpendicular or substantially perpendicular with respect to the component and plate, or alternatively can extend at an acute or obtuse angle.

Also note that since the retainer does not lie in a single plane and has various curvatures, the bristles of the present invention can be designed in some embodiments to conform to such various curvatures. Such conformance could enhance bristle-to-retainer contact to improve cleaning/brushing of the retainer by the arrays of bristles. Also, the provision of top and bottom arrays of bristles enables simultaneous cleaning of both sides of the retainer.

The use of the container 50 of FIGS. 7-14 is the same as in Steps 1-7 described above in conjunction with container 10, the difference being the interlocking engagement of the top and bottom components 52, 60 and the application of the counterforce to release the top and bottom components from the locking mechanism to open the container 50.

Although the apparatus described herein is a combined cleaning and storing apparatus, it is also contemplated that the apparatus can be used just for cleaning and then the cleaned retainer stored in another container.

Although the apparatus and methods of the subject disclosure have been described with respect to preferred embodiments, those skilled in the art will readily appreciate that changes and modifications may be made thereto without departing from the spirit and scope of the present disclosure as defined by the appended claims.

Additionally, persons skilled in the art will understand that the elements and features shown or described in connection with one embodiment may be combined with those of another embodiment without departing from the scope of the present invention and will appreciate further features and advantages of the presently disclosed subject matter based on the description provided.

Throughout the present invention, terms such as "approximately," "generally," "substantially," and the like should be understood to allow for variations in any numerical range or concept with which they are associated. For example, it is intended that the use of terms such as "approximately" and "generally" and "substantially" should be understood to encompass variations on the order of 25%, or to allow for manufacturing tolerances and/or deviations in design. By way of example, an angle of substantially 100 degrees would encompass an angle of 75 degrees as well as an angle of 125 degrees.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A container for cleaning an orthodontic appliance comprising:

a) a first component having a first set of bristles arranged in a first array, the first set of bristles having a first plurality of bristles having a first height, a second plurality of bristles positioned inwardly of the first plurality of bristles and having a second height less than the first height and a third plurality of bristles positioned inwardly of the second plurality of bristles and having a third height greater than the second height; and b) a second component having a second set of bristles arranged in second array, the second set of bristles extending toward the first set of bristles when the container is in a closed condition;

c) wherein the first component is rotatable relative to the second component to clean the orthodontic appliance positioned within the containers;

d) wherein the first component first cavity and the second component has a second cavity, the first set of bristles extends within the first cavity and the second set of bristles extends within the second cavity, the second set of bristles including bristles extending distal of a distalmost edge of the second cavity to contact bristles of the first set of bristles.

2. The container of claim 1, comprising a locking mechanism for locking the first and second components together to cure the components during rotation of the first component relative to the second component.

3. The container of claim 2, wherein the locking mechanism maintains at least some of the first set of bristle and/or at least some of the second set of bristles in continuous contact with the orthodontic appliance.

4. The container of claim 1, wherein the first array of the first set of bristles is different than the second array of the second set of bristles.

5. The container of claim 1, wherein the first array of the first set of bristles is the same as the second array of the second set of bristles.

6. The container of claim 1, wherein distal tips of the first set of bristles and distal tips of the second set of bristles extend in an imaginary line forming a substantially sinusoidal wave from an outermost region to a more central region.

7. Container of claim 1, wherein the first set of bristles forms a concavity and the second set of bristles forms a concavity, the concavity of the second set of bristles defined between outermost region and a more central region.

8. The container of claim 1, wherein the first component includes a first housing and a first support plate positioned within the first housing, the first set of bristles extending downwardly from the first support plate, and the second component includes a second housing and a second support plate positioned within the second housing, the second set of bristles extending upwardly from the second support plate, wherein one or both of the first support plate and second support plate are removably attachable to the first and second housings, respectively.

9. The container of claim 1, wherein the first component is releasably lockingly engageable with the second component to clean the orthodontic appliance as the first and second sets of bristles frictionally engage the orthodontic appliance on opposite sides.

10. The container of claim 9, wherein a locking mechanism releasably lockingly engages the first and second components, the locking mechanism including a locking post engageable with a receiver in a male-female engagement.

11. The container of claim 9, wherein the first component includes a first housing and a first support plate positioned within the first housing, the first set of bristles extending downwardly from the first support plate, and the second component includes a second housing and a second support plate positioned within the second housing, the second set of bristles extending upwardly from the second support plate.

12. The container of claim 9, wherein the second set of bristles are of differing heights.

13. A container for cleaning an orthodontic appliance comprising:

a) a first component having a first set of bristles arranged in a first array;

b) a second component having a second set of bristles arranged in a second array, the second set of bristles extending toward the first set of bristles when the container is in a closed condition;

c) wherein the first component is rot to the second component to clean the orthodontic appliance positioned within the container; and d) a locking mechanism for locking the first and second compo together secure the components during rotation of the first component relative to the second component, wherein the locking mechanism comprises a post received within a receiver, the receiver including a plurality of fingers biased inwardly in a locking position, and expandable by the post when initially inserted into the receiver.

14. A container for cleaning an orthodontic appliance comprising:

a) a first component having a first set of bristles arranged in a first array, the first of bristles having a first plurality of bristles having a first height, a second plurality of bristles positioned inwardly of the first plurality of bristles and having second height less than the first height and a third plurality of bristles positioned inwardly of the second plurality of bristles and having a third height greater than the second height; and b) a second component having a second set of bristles arranged in a second array, the second set of bristles extending toward the first set of bristles when the container is in a closed condition;

c) wherein the first component is rotatable relative to the second component to clean the orthodontic appliance positioned within the container;

d) wherein the first component is releasably lockingly engageable with the second component to clean the orthodontic appliance as the first and second sets of bristles frictionally engage the orthodontic appliance on opposite sides;

e) wherein a locking mechanism releasably lockingly engages the first and second components, the locking mechanism including a locking post engageable with a receiver in a male-female engagement;

f) wherein the receiver includes a plurality of fingers having shoulders to blockingly engage a flange of the locking post.

15. The container of claim 14, wherein a height of the orthodontic appliance is defined between the first and second housings and a bottom surface at the first support plate abuts a bottom surface of the first housing.

* * * * *